Sept. 29, 1931.  A. S. McDANIEL  1,825,196
HAND TRUCK
Filed Dec. 14, 1929
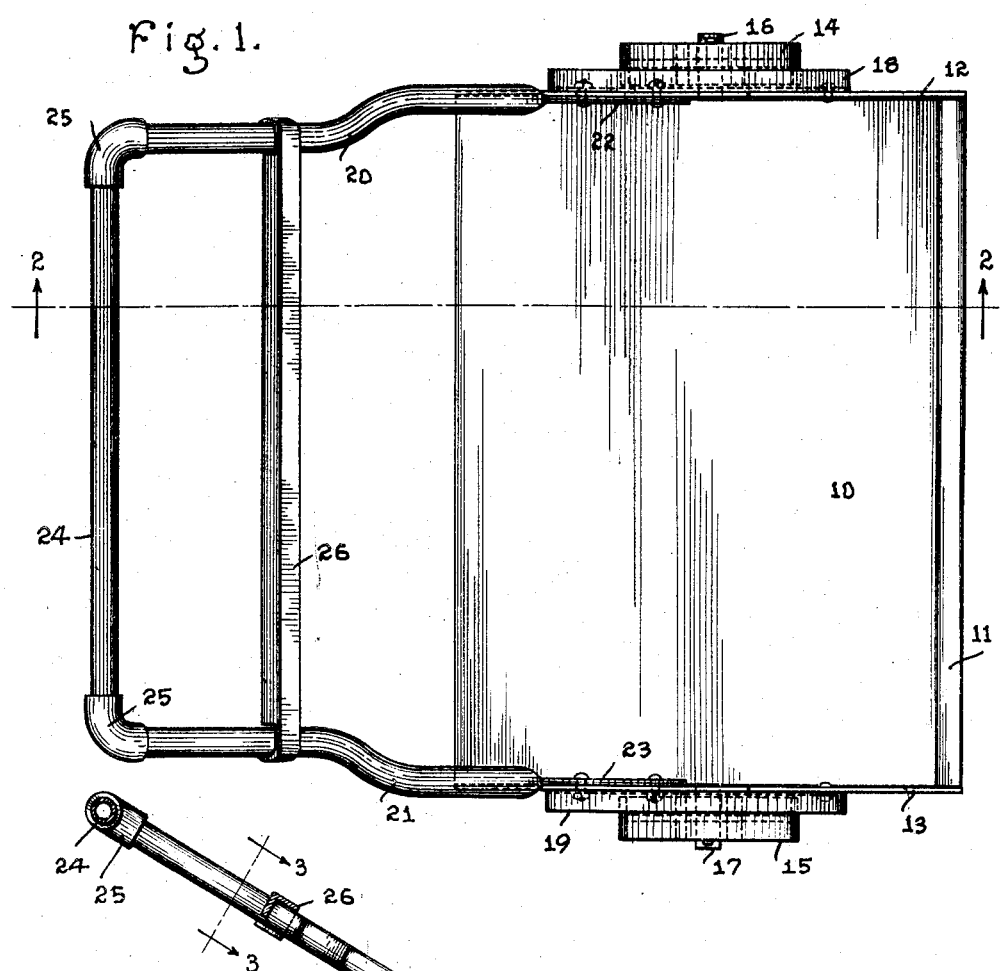
Fig. 1.
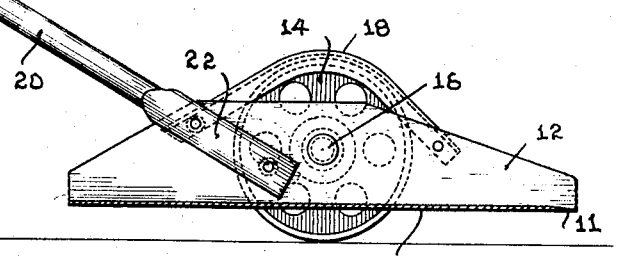
Fig. 2.
Fig. 3.
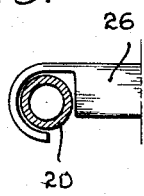
Inventor
A. S. McDaniel
By J. Richard Paris.
Attorney Patented Sept. 29, 1931

1,825,196

UNITED STATES PATENT OFFICE

ALEX S. McDANIEL, OF BRADFORD, PENNSYLVANIA

HAND TRUCK

Application filed December 14, 1929. Serial No. 414,131.

This invention relates to a hand truck of the type used in stores, warehouses and factories, for handling and conveying various types of heavy loads, such as boxes and barrels as well as other types of loads which take on a different form as for example, long material such as shafting, channel iron and the like, which may be as much as thirty feet in length.
One of the objects of the invention is to provide a truck of the type above described which is simple and rugged in construction, whereby the truck is rendered more serviceable and more convenient than the trucks heretofore constructed.

Another object of the invention is to provide a truck in which the load will be supported by and substantially balanced on the two wheels so that the operator of the truck does not support any substantial portion of the load but merely pushes the truck and load against the rolling friction of the wheels.

A further object of the invention is to so construct and arrange the platform and the wheels with relation to each other that in placing a load on the truck which is in the form of a box or a barrel or the like, the front edge of the platform will slide under the barrel or box and thereby the truck may be loaded without any disturbance of the box or barrel: this being just as applicable to a barrel filled with liquid as to any other type of load.
Another object of the invention is to facilitate the handling of certain loads, such as an open top barrel which is nearly full of liquid and which must be carried at an angle which is not far from vertical.
For this purpose the relative arrangement of the wheels and the platform cooperate with the disposition of the handle bars so as to permit of supporting the load on the platform in substantially vertical position, the handles being utilized merely for exerting the force against the rolling friction of the wheels.

Another object of the invention is to construct a truck of the type above described in which the platform has a very much smaller clearance over the floor than in the trucks known hitherto whereby the handling and transportation of loads are greatly facilitated.

Other objects of the invention will be apparent from the drawings which constitute a part of this application and the detailed description thereof in the following specification; it being understood, however, that these merely represent one specific embodiment of the applicant's invention and that many modifications will be apparent to those skilled in the art.

In the drawings:

Fig. 1 represents a plan view of the truck.

Fig. 2 is a sectional view on the line 2—2 of Fig. 1.

Fig. 3 is a detailed view along the line 3—3 of Fig. 2.

In the drawings, the reference character 10 shows the platform which is preferably made of sheet steel such as twenty point carbon steel; this particular type of material being selected for the purpose of giving the platform sufficient hardness so that metallic containers, castings, or other loads, will slide up on the platform with a minimum of friction when being loaded or unloaded.

The material of the platform is also selected for the purpose of eliminating the necessity of a special axle under the platform. The platform 10 is thin at its forward edge 11 as shown in the drawings for the purpose of facilitating the loading of the truck and thereby eliminating the bodily handling of barrels or any other load that the truck may be used for. The platform is preferably provided with integral upstanding flanges 12 and 13 of the same material as the platform 10 and the wheels 14 and 15 are carried by stub shafts 16 and 17, respectively, which are riveted to the flanges 12 and 13, respectively, at points substantially midway of the front and rear edges of the platform 10. The disposition of the shafts 16 and 17 at points midway between the front and rear edges of the platform makes it possible to so load the truck that substantially the entire weight of the load is supported by the wheels so that when the truck is used the operator does not support the weight of the load but merely has to push against the rolling friction of the wheels. The shafts 17 and 16 are also disposed at a substantial height above the platform 10 so that the clearance between the platform and the floor is reduced to a minimum. In actual construction, the truck has a maximum clearance of one and one-half inches above the floor. This advantage flows from the use of strong steel plate in the manufacture of a platform and flanges so that the use of an axle under the platform is entirely eliminated.

The flanges 12 and 13 also carry arcuate wheel guards 18 and 19 which are riveted to the flanges as shown.

The handles 20, 21, are preferably made of steel pipe, the lower ends thereof being flattened as shown at 22 and 23 and riveted to the inner faces of flanges 12 and 13, respectively. The upper ends of the handles are connected by a cross bar 24, which is also preferably in the form of a steel pipe, being connected to the handles 20 and 21 by arcuate pipes 25. The handle bars 20, 21 are preferably bent in such a manner that the upper ends thereof are spaced more closely than the lower ends thereof and the slidable cross bar 26 is carried by the handle bars 20, 21, the bent portion thereof serving as a stop for the cross bar 26. The cross bar 26 is preferably in the form of an angle iron, one flange thereof being extended and bent around the handle bars 20 and 21, as shown.

The handle bars 20 and 21 are preferably disposed at an angle with relation to the platform 10, the angle being selected so that the handle bars do not overlie the space over the platform 10 with the result that a barrel or any box or package of substantial dimensions can be supported on the platform in the center thereof without interfering with any portion of the handle bars. Moreover, the disposition of the handle bars at the angle shown makes it possible to exert a force on the load in the direction of movement of the truck.

The all steel construction of the truck makes it particularly adapted for the handling of hot castings in foundries, forge shops and the like.

Having described my invention, I do not wish to be limited to the specific embodiment thereof, many modifications being apparent which will fall within the scope of the appended claims.

I claim:

1. A hand truck comprising an integral sheet steel platform having integral flanges projecting upwardly from the lateral edges thereof, a pair of aligned stub shafts affixed to and carried by said flanges at points substantially midway of the front and rear edges of said platform and a substantial distance above said platform and projecting laterally and outwardly from said flanges, a pair of wheels rotatably mounted on said stub shafts, and a handle bar secured to said platform.

2. A hand truck comprising an integral sheet steel platform and also having integral flanges projecting upwardly from the lateral edges thereof, a pair of aligned stub shafts affixed to and carried by said flanges at points substantially midway of the front and rear edges of said platform and a substantial distance above said platform and projecting laterally and outwardly from said flanges, a pair of wheels rotatably mounted on said stub shafts, and a pair of handle bars affixed to the lateral flanges.

3. A hand truck comprising an integral sheet steel platform having integral flanges projecting upwardly from the lateral edges thereof, a pair of aligned stub shafts affixed to and carried by said flanges at points substantially midway of the front and rear edges of said platform and a substantial distance above said platform and projecting laterally and outwardly from said flanges, a pair of wheels rotatably mounted on said stub shafts, a wheel guard carried by each flange on its outer face, and a pair of handle bars affixed to the flanges at points adjacent said shafts and extending rearwardly and upwardly at an angle to completely clear the space overlying the platform and to facilitate the movement of the loaded truck by a force in its direction of movement.

4. A hand truck comprising an integral sheet steel platform having a thinned forward edge, and also having integral flanges projecting upwardly from the lateral edges thereof, a pair of aligned stub shafts affixed to said flanges at points substantially midway of the front and rear edges of said platform and a substantial distance above said platform and projecting laterally and outwardly from said flanges, a pair of wheels rotatably mounted on said stub shafts, a wheel guard carried by each flange on its outer face, a pair of handle bars affixed to the flanges at points adjacent said shafts and extending rearwardly and upwardly at an angle to completely clear the space overlying the platform and to facilitate the movement of the loaded truck by a force in the direction of movement, an integral cross member carried by said bars at their free ends, and a slidable cross member carried by said bars, the outer portion of said bars being spaced more closely than the lower portions, thereby forming shoulders that serve as a stop for said slidable cross bar.

In witness whereof I hereunto affix my signature.

ALEX S. McDANIEL.